Patented Dec. 27, 1932

1,892,449

UNITED STATES PATENT OFFICE

FRANZ PETER DENGLER, OF CHICAGO, ILLINOIS, ASSIGNOR TO LLOYD M. BROWN, OF CHICAGO, ILLINOIS

PROCESS OF TREATING CHOCOLATE LIQUOR CONTAINING PROTEINS, STARCHES AND FATS

No Drawing.   Application filed June 5, 1929. Serial No. 368,743.

The present invention relates to an improved process of treating chocolate liquor containing proteins, starches and fats.

One of the objects of my invention is to liberate fats and oils from vegetable materials without the necessity for the employment of hydraulic presses or the use of solvents.

Another object of my invention is to treat vegetable materials containing proteins, starches and fats while suspended in an aqueous medium with proteolytic enzymes which will cause a peptization of the proteins without any deleterious effects upon the fat or oil therein contained, thus causing a separation of the fat from the said vegetable material.

A further object of my invention is to carry out the process under such conditions that the fat or oil will be liberated in the molten condition so that the same may rise to the surface of the liquid in which the process is carried out whereby an effective separation of the fat or oil from the non-fatty constituents of the vegetable materials undergoing treatment may be effected.

A further object of my invention is to manufacture from cacao products a very high grade cacao butter by a process that involves the peptonization of the proteinlike products in the cacao and at least partial digestion of the fibrous constituents thereof.

Another object of my invention is to treat chocolate liquor with water and with proteolytic enzymes, whereby the proteins in the cacao will become peptized and hence rendered soluble, and whereby the fibers will be swollen and the cells broken so that the cacao butter therein contained may be liberated and may rise to the surface of the water, there to be skimmed or drawn off for use.

Another object of my invention is to separate the constituents of cacao into fat, peptized proteids, solubilized starch and theobromine.

Other objects of my invention will become evident from the description hereinbelow.

Cacao beans of commerce are usually split or broken so as to be divided into what is known as nibs and husks. The nibs contain the most valuable portions of the cacao bean and it is the nibs that are employed almost exclusively for the manufacture of chocolate products. A typical analysis of the cacao nibs (sometimes, also, spoken of as kernels) shows that the said kernels in their natural undried condition, or raw cacao, contain approximately 13.73% of nitrogenous (proteid) constituents; about 50% of fat as cacao butter; 1.37% of theobromine; 6.25% of starch, and 3.13% of cellulose. These percentages vary somewhat and an analysis of a large number of cacao nibs shows that the fat content may vary between 47 and 53.65%.

It will thus be seen that cacao nibs consist primarily of fat and that the nitrogenous (proteid) constituents thereof are approximately twice that of the starch contents.

When the cacao nibs are ground up into what is technically known as chocolate liquor, or bitter chocolate (also designated in the trade as chocolate paste, plain chocolate and bitter chocolate coating), the fat which is originally contained within the individual cells of the cacao nib is caused to adhere very firmly to the fibrous constituents thereof and is also so closely associated with the proteid and starchy constituents as to render the removal of the same by hydraulic pressure extremely difficult.

In commercial practice the chocolate liquor is usually finely ground and is then subjected to high pressure in hydraulic presses at a temperature above the melting point of the cacao butter (above 86° F.) so that the latter will be removed in the form of a liquid oil. By reason of the close adhesion of the cacao butter to the non-fatty constituents of the nib it is possible to remove only two-thirds of the fat by this process.

An alternate process used in the art is the treatment of the chocolate liquor with organic solvents such as benzene, ether, carbon tetrachloride or trichloroethylene, the fat being soluble in these solvents and being recoverable therefrom by distilling off the solvents in a suitable still. However, the fat remaining after the removal of the solvent tenaciously retains a small portion thereof, thus imparting to the fat a very undesirable flavor and rendering the same entirely uncommercial either for edible or medicinal purposes.

My present process obviates the necessity for the use of hydraulic presses and also renders the use of solvents entirely unnecessary.

While I am describing my process in connection with the recovery of cacao butter from chocolate liquor, I desire to be understood that the process is equally applicable to the recovery of fats and oils from similar vegetable materials containing proteids and starches. The exact process to be followed in the case of materials other than chocolate will be described hereinbelow after I have given a description of the process of carrying out my invention in connection with chocolate liquor.

The fundamental principle involved in my invention embraces the use of proteolytic enzymes, preferably of two different kinds, used simultaneously. These enzymes produce a number of chemical and physical effects. The first effect is the swelling and bursting of the cell walls in the plant cells of the cacao nib; a further effect being the peptization and hence solubilization, of the proteins contained in the chocolate liquor. These proteins are converted by the enzyme into water soluble products. I wish it to be distinctly understood that my process is not one of fermentation and that no gases of any kind are produced and that the products produced by the action of the enzymes are useful, as they are non-poisonous and edible.

I am aware that processes have been disclosed in the past in which the starchy constituents of the chocolate liquor have been hydrolyzed by means of diastase, whereupon the resulting maltose has been fermented by yeast so as to produce carbon dioxide and alcohol. As an incident to the carrying out of the said fermentation process, the fat was liberated but the resultant by-products were of practically no use in the further manufacture of edible chocolate products. Also, the liberation of the large amounts of carbon dioxide would bring the fat to the surface in the form of discrete droplets which would fail to coalesce into a coherent oily layer. Furthermore, the alcohol produced in the said fermentation process has a deleterious effect upon the cacao butter and gives the same an unmistakably musty taste which renders the butter unfit for medicinal use and is highly objectionable when the butter is used for making confectionery.

My process, on the contrary, imparts no undesirable flavor to any of the products obtained and all of them are commercially usable and I consider this to be a very great step in advance in this art.

By my process there is no necessity for boiling the chocolate or for heating the same under pressure and the entire process is rapidly carried out at temperature beginning slightly above that of the average room and completed well below the boiling point of water, and the separation of the fat from the other constituents in the cacao is substantially quantitative. As the preferred enzymes, I employ papain and pepsin, using them simultaneously, as I have found that neither of them alone will work as well as the two together. As an exemplification of the manner in which my process is carried out, I will now describe the same, using as a unit of measure 100 pounds of commercial chocolate liquor.

It is to be understood that the proportions given may obviously be varied, but in essence they are the proportions found to give the most satisfactory results. If larger or smaller batches are to be worked, the figures given may be taken proportionately, either increasing or decreasing the various amounts given, as the case may be.

*Example*

100 pounds of commercial chocolate liquor are ground to a smooth paste and are then placed in a vat or tank where they are mixed with 100 quarts (one quart per pound of chocolate) of water at a temperature of 120° F. The entire mass of water and chocolate liquor is then heated until it has a uniform temperature of 120° F. When this stage has been reached, 200 quarts of water previously heated to 120° F. are run into this mixture to dilute the same. This produces a total of 300 quarts of water containing 100 pounds of the original chocolate liquor. This mass is agitated and maintained at a temperature of 120° F. for about ten minutes in order to produce as uniform a mixture as possible.

One-quarter ounce of papain is then dissolved or brought into suspension in four ounces of water that has been treated to 100° F. This papain suspension is then incorporated into the mass of water and chocolate liquor. About ten minutes are allowed to elapse while the mass is stirred so as to cause a thorough dispersion of the papain on the chocolate liquor suspension.

The pepsin solution is composed of one-half ounce of powdered or spongy granules of pepsin dissolved at 90° F. in one pint of water acidulated with hydrochloric acid, so that it contains 0.4% of the latter. The pepsin used is of a commercial strength of 1:3000. This pepsin solution, prepared as just described, is then added to the chocolate liquor suspension and the entire mixture thoroughly agitated whilst its temperature is slowly raised from the said 120° F. to 175°–180° F. and maintained at the latter temperature for about five minutes, after which time one pound of cacao butter is added.

Heating the entire mixture at the said temperature of 180° F. is then continued for from 15 to 30 minutes, during which time the cacao butter contained in the chocolate liquor will become liberated and will float to the surface, forming there a continuous oily layer. This oily layer, when it has attained a substantial depth, is then either drawn off or skimmed. The introduction of the initial amount of cacao butter serves to act as a "seed" which apparently aids in the more rapid separation of the cacao butter contained in the chocolate liquor, although I have found that its introduction is not absolutely essential. The actual time required is about two to three hours, at the end of which time substantially all of the cacao butter will be separated and will have risen to the surface.

It has been found advantageous in practice to skim or draw off the molten suspended cacao butter from the surface at the end of about 45 minutes and thereupon further to dilute the suspension to about double its volume. This causes a further removal of cacao butter which then rises to the surface and may be then skimmed or drawn off.

The cacao butter as withdrawn from the surface of the suspension may contain some entrained particles of chocolate liquor and is, therefore, filtered, whereupon it may be cast into slabs for commercial use.

Utilization of by-products

After the cacao butter has been removed from the surface of the suspension, the latter is allowed to settle. The insoluble particles of the cacao subside, whilst the supernatant liquor contains the coloring matter of the cacao, the solubilized proteids and starches originally contained in the chocolate liquor and all of the theobromine. In utilizing the non-fatty constituents of the chocolate I prefer to proceed substantially as follows:

The suspension is filtered. The material remaining on the filter is dried and forms a substantially fat-free chocolate product rather high in fibre but which may be utilized for feeding purposes as it contains considerable nutriment. The filtrate is evaporated preferably in a vacuum evaporator, until it has been reduced to a syrupy or honey-like consistency. This honey-like residue is then mixed with hot benzene or alcohol. If benzene is used, the material is slightly agitated whereby the theobromine will become dissolved in the benzene. After separation of the benzene from the aqueous portions by stratification, the benzene is transferred to a suitable still and distilled, leaving the theobromine in the still in the form of a pasty mass which may be removed and allowed to crystallize. After drying the mass of crude theobromine, it may be dissolved in water and re-crystallized therefrom to form commercial theobromine. The theobromine-free residue may, after heating the same to remove the benzene, form the basis of a nitrogenous food product which contains the proteins in the form of peptones and which has an agreeable flavor and may form the basis for a meat extract substitute or may be incorporated into candy or other edible products.

If alcohol is used in place of benzene, the alcohol will cause a precipitation or coagulation of the peptized protein constituents of the honey-like product while the theobromine dissolves in the alcohol. This mixture is then filtered, leaving the peptized protein materials behind in insoluble form. These products, however, are soluble in water but are not soluble in fairly concentrated alcohol. The theobromine is recovered from the alcohol by the usual evaporation to the crystallizing point.

The cacao butter produced by my process is almost white and is entirely free from any undesirable flavor or taste and has a melting point of about 90° to 92° F. and meets all the requirements both of the pure food laws as well as of the United States Pharmacopoeia.

As I have already stated, my process is also applicable for the liberation of oil and fat from other vegetable products. For instance, I may take wheat or corn germs and bruise the same and suspend them in water, and thereupon act upon the suspension with papain and pepsin, whereby a liberation of wheat oil or corn oil, as the case may be, will be effected.

I may employ a similar process to cotton seed whereby liberation of cotton seed oil is effected.

The amount of water used should in all cases be large enough so that the oil will have sufficient surface upon which to collect and there be sufficient depth to the vessel to allow the non-oily portions to subside.

The cost of my process is considerably lower than either of the pressure or solvent processes first hereinabove mentioned, and the apparatus required is extremely simple and inexpensive.

Other enzymes, provided they do not cause fermentation, may be employed. For example, I may employ rennin or trypsin to replace the papain and pepsin, but I have found that the enzymes used in my above example give the most satisfactory results.

As an alternate process for recovery of theobromine, I may mix the honey-like evaporated product above mentioned with quicklime, so as to dry the same and then subject the dried, powdered product to extraction with alcohol to recover the theobromine.

The essential feature of my invention is the treatment of vegetable products containing fatty or oily constituents with digestive enzymes capable of breaking up the adhesion between the fat and non-fatty components of the products, whereby the fat is liberated.

In the hereunto appended claims the word "fat" is used generically and is intended to include such species of fat as oils, cacao butter and mixtures of glycerides, commonly designated as fatty oils. The term "digesting" in the claims is employed as a generic term which includes the species of digestion termed peptization, the peptonization of proteids, and the solubilization of starches.

I claim:

1. The process of treating chocolate liquor, which comprises comminuting the same, suspending it in acidulated water, treating it therein with papain and pepsin—whereby the fat will become disassociated from the non-fatty constituents of the vegetable matter and will rise to the surface of the water,—and removing said fat from the water.

2. The process of preparing cacao butter, which comprises suspending chocolate liquor in water, treating it therein with papain, pepsin and hydrochloric acid whereby the cacao butter will be liberated and rise to the surface of the suspension, and removing said cacao butter from the said surface.

3. The process of preparing cacao butter which comprises suspending finely ground chocolate liquor in warm water and treating it with papain, pepsin and hydrochloric acid whereby the cacao butter will be liberated as an oil and will rise to the surface, and removing said cacao butter from the surface.

4. The process of preparing cacao butter which comprises suspending 100 lbs. of ground chocolate liquor in 300 quarts of acidulated water at substantially 120° F., adding one-quarter ounce of papain to suspension thus formed, adding one-half ounce of pepsin to the suspension and warming the suspension to 175–180° F. whereby the cacao butter contained in the chocolate liquor will be liberated and will rise to the surface of the suspension, and removing the cacao butter from the said surface.

5. The process of preparing cacao butter which comprises suspending 100 lbs. of ground chocolate liquor in 300 quarts of water at substantially 120° F., adding one-quarter ounce of papain to suspension thus formed, adding one-half ounce of pepsin dissolved in one pint of 0.4% hydrochloric acid to the suspension and warming the suspension to 175–180° F. whereby the cacao butter contained in the chocolate liquor will be liberated and will rise to the surface of the suspension, and removing the cacao butter from the said surface.

6. The process of treating chocolate liquor to recover values therein contained, which comprises suspending ground chocolate liquor in acidulated water and subjecting it to the digestive action of papain and pepsin, dissolving the theobromine and liberating the cacao fat therein contained, skimming the thus liberated fat from the surface of the suspension whence it rises, filtering the defatted suspension, evaporating the filtrate to syrupy consistency, and extracting the theobromine therefrom.

7. The process of liberating cacao butter from chocolate liquor which comprises suspending finely ground chocolate liquor in an aqueous medium, adding papain thereto, allowing the mixture to stand for a short time, adding slightly acidified pepsin solution to the aforesaid mixture, allowing the mixture to stand, thereupon gradually increasing the temperature of the mixture to at least the melting point of cacao butter whereby the latter rises as an oily layer to the top of the mixture, and recovering said cacao butter.

8. The process of treating chocolate liquor to separate the cacao butter therein contained, which consists in finely grinding said chocolate liquor, suspending the same in water, adding papain to the suspension, adding slightly acidulated pepsin solution to the suspension, gradually heating the suspension to a temperature of 180° F. whereby the cacao butter is liberated as an oil tending to float on said suspension, adding a small amount of extraneous cacao butter to the suspension to cause flowing together of the oily drops of cacao butter at the surface of the suspension, removing a portion of the cacao butter thus collected at the surface, thereupon diluting the suspension to about double its volume with water, whereby a further quantity of cacao butter will rise and collect at the surface, and removing said second crop of cacao butter.

In witness whereof, I have hereunto subscribed my name.

F. PETER DENGLER.